Figure 1:
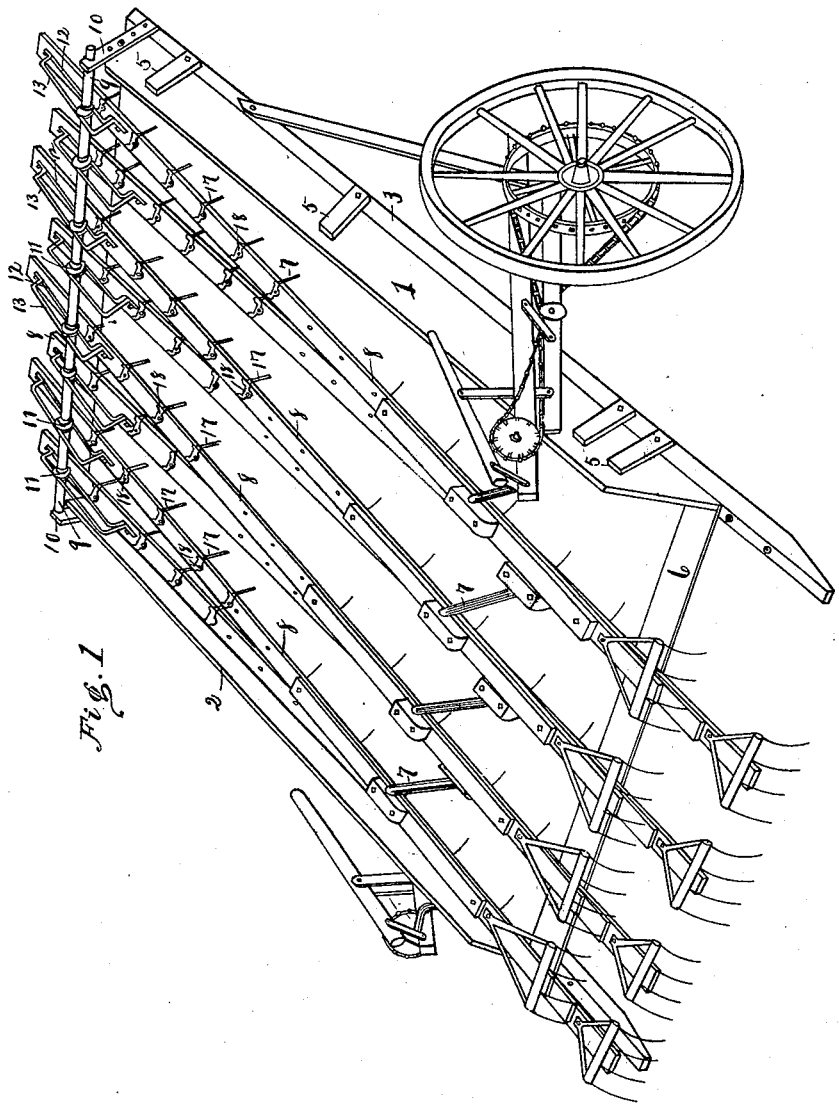

(No Model.) 3 Sheets—Sheet 1.

J. T. BELL & A. T. STEWART.
H. C. GRAVES, Executor of J. T. BELL, Deceased.
HAY RAKE AND LOADER.

No. 520,422. Patented May 29, 1894.

WITNESSES:
J. E. Tesseyman.
George S. Williams

INVENTORS
Alexander T. Stewart.
Henry C. Graves. Ex'r of
BY Jno. T. Bell.
R. Jay McCarty,
ATTORNEY.

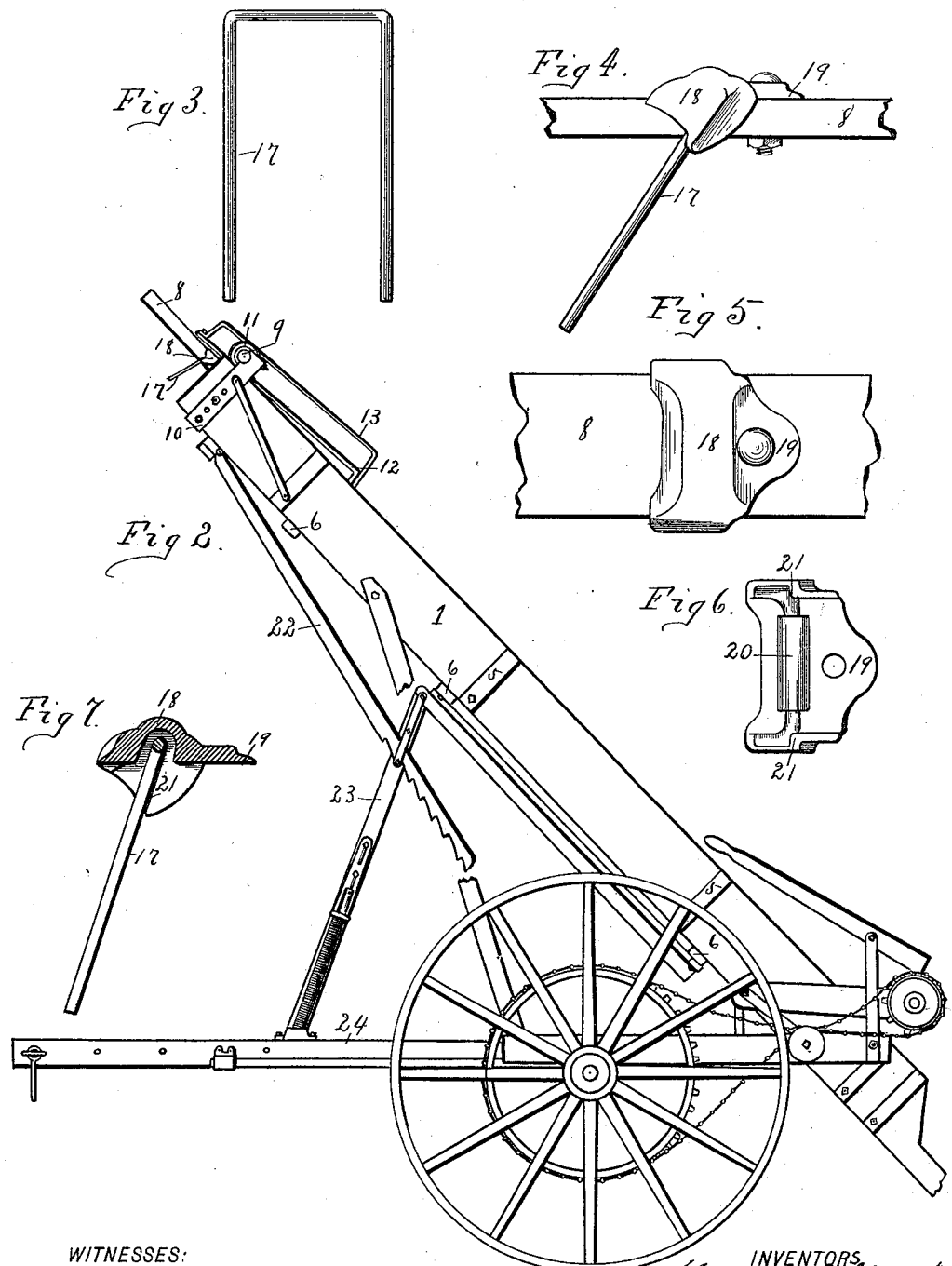

(No Model.) 3 Sheets—Sheet 3.
J. T. BELL & A. T. STEWART.
H. C. GRAVES, Executor of J. T. BELL, Deceased.
HAY RAKE AND LOADER.
No. 520,422. Patented May 29, 1894.
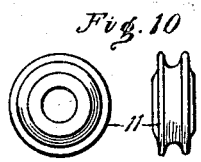
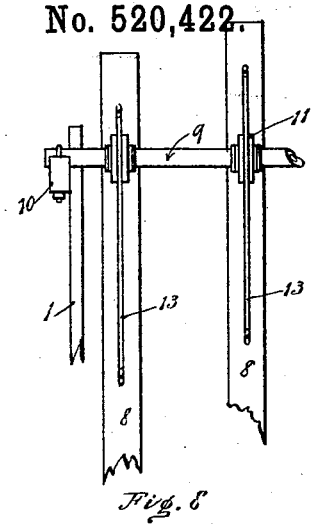
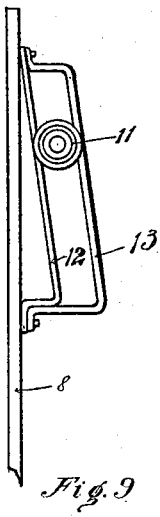
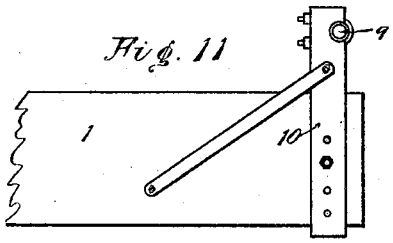
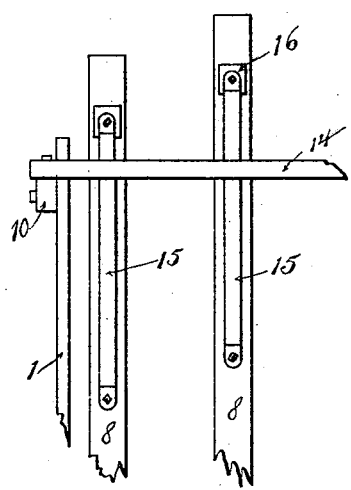
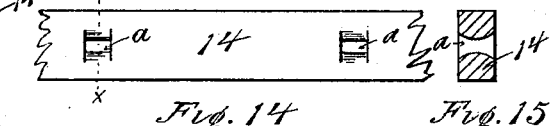
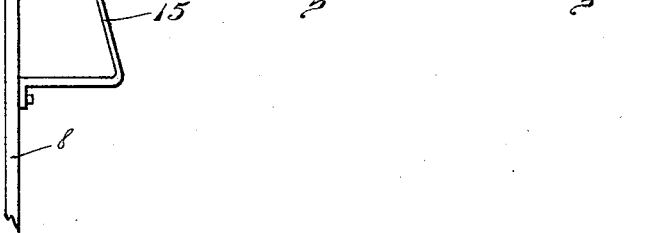
WITNESSES:
J. E. Tisseyman
H. L. Dunn
INVENTORS
Alexander T. Stewart,
Henry C. Graves, Exr of
Jno. T. Bell.
BY
R. J. McCarty
ATTORNEY.

UNITED STATES PATENT OFFICE.

HENRY C. GRAVES, EXECUTOR OF JOHN T. BELL, DECEASED, AND ALEXANDER T. STEWART, OF DAYTON, OHIO, ASSIGNORS TO THE OHIO RAKE COMPANY, OF SAME PLACE.

HAY RAKE AND LOADER.

SPECIFICATION forming part of Letters Patent No. 520,422, dated May 29, 1894.

Application filed August 28, 1893. Serial No. 484,259. (No model.)

*To all whom it may concern:*

Be it known that I, ALEXANDER T. STEWART, of Dayton, county of Montgomery, State of Ohio, have, jointly with JOHN T. BELL, deceased, (HENRY C. GRAVES, executor of said JOHN T. BELL,) invented a new and useful Improvement in Hay Rakes and Loaders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in hay rakes and loaders.

The object of said improvements is to provide means to greatly facilitate the removal of hay from the loader to the wagon, which is accomplished by having the reciprocating mechanism, or the rake arms, and the forks, nearest the throat of the machine, so constructed and arranged that their action upon the hay is had upon the upward or forward movement of the arms; the return or downward movement having no pressure to carry the hay backward with it.

A further object is to provide means for increasing or decreasing the area of the throat so that the loader may be adjusted to suit a thick and heavy quality of hay, or the area of the throat may be decreased when a light crop is gathered.

To these ends the improvements have reference to certain features that will be hereinafter fully described in the specification and pointed out in the claims.

As supplemental the specification, the accompanying drawings are referred to, upon which similar reference characters denote corresponding parts.

Figure 1 is a view in perspective, of a hay loader with the improved attachments, the bottom slats and cross-ties being removed to promote clearness. Fig. 2 is a side elevation of the loader; Fig. 3 a detached, detail view of a fork; Fig. 4, a side elevation of a fork and bracket, bolted to a rake arm, parts of the arm are broken away; Fig. 5, a top view of Fig. 4; Fig. 6, a detached detail view of one of the fork brackets, looking at the under surface thereof; Fig. 7, a horizontal section centrally through the bracket and a fork; Fig. 8, a top view of two of the rake arms, and the front shaft, parts of which are broken away; Fig. 9, a side view of a portion of a rake arm, and guide pieces; Fig. 10, views of the anti-friction rollers, detached; Fig. 11, a side elevation of a portion of one of the side pieces with one of the adjustable uprights; Fig. 12, a top view of two of the rake arms and cross-bar, a modification, parts are broken off; Fig. 13, a side view of one of the rake arms, a modified form of guide pieces, and cross bar, the latter in section; Fig. 14, a side view of a portion of the cross bar; Fig. 15, a section on the line $x$—$x$ of Fig. 14.

The supporting frame consists of side pieces 1 and 2, which are rigidly attached to stringers 3 and 4 by means of uprights 5, the stringers are rigidly attached to cross ties 6, any desirable number of which may be used, and upon which the bottom slats are placed, these slats are not shown in the drawings, as they are a well known feature. The body or frame is mounted on the ground wheels in the usual manner, and as the running gear is commonly understood, further reference is believed to be unnecessary.

7 represents the crank shaft journaled in suitable bearings and rotated by sprocket chain and wheel mechanism.

8 represents a series of rake arms, which are mounted on the crank shaft at the apexes of the series of angles formed on said shaft, so that, at whatever position the crank may be, each alternate arm will occupy a different plane from that of the adjacent arm.

9 is a roller shaft mounted on upright bearings 10—10, adjustably attached to the side pieces 1—2; upon this shaft a series of anti-friction rollers 11, are mounted. A series of guides are fixed to the arms 8 and have a bearing upon these rollers; these guides inclose the rollers, and consist of angular pieces 12—13 fixed to the rake arm in a manner to form inclining upwardly as it leaves the upper end of said arm. By the provision of the inclined guides, the arms are enabled to get down closer to the bed of the loader, and thereby narrows the discharging throat, this brings the load into a closer space, and a more effective and complete discharging of the hay is the result. This is the case when the lower ends of either of the series of rake arms have been elevated to the highest plane by the crank shaft; the upper ends of said arms are at this time in closer proximity to the bed of the loader by reason of their being controlled by the inclined guides and the shaft 9; the continued rotation of the crank shaft causes a lowering of the lower ends of the rake arms and a downward movement of said arms while the upper ends thereof are caused to rise perceptibly; the effect is to narrow the space of the discharging throat while the rake arms are carrying the hay upward thereby crowding it out, and to increase said space on the downward movement of said arms. This operation it will be understood is accomplished by the joint action of the crank shaft at the lower ends and the inclined guides at the upper ends of the rake arms.

The forms depicted in Fig. 12 and those following may be employed as a more economical construction, without departing from the spirit of the invention. In this modified form 14 indicates a cross bar of timber with bevel surface openings $a$—$a$; this bar is attached to the adjustable uprights 10, in a manner similar to the mounting of the shaft 9, and may be substituted therefor. 15 indicates an inclined guide constructed of one piece as contra-distinct from the guide used in connection with shaft 9; this guide piece 15 is inserted through the openings $a$—$a$ in the cross bar and bolted to the arms, one end in contact with a block 16 through which the bolt passes. The beveled slot in the cross bar permits the reciprocating motion of the arms free from the binding of the parts.

Coming now to another feature of the improvements, 17 indicates a vibrating fork, a suitable number of which, say—eight or more, being carried on each arm. These forks are constructed in the angular shape shown in Fig. 3, and are placed over the upper surface of the rake arm, and inclosed by a bracket 18 which is bolted through a flanged portion 19, to the arm; the upper transverse portion of the fork fits in a recess 20 in the under surface of said bracket, and is free to vibrate in one direction only, to wit, when the arm is making its return trip, at which time said fork readily yields to any pressure exerted against it, and assumes a position nearly horizontal, so that the forks relieve themselves as the arm is carried backward in its longitudinal movement by the action of the crank shaft to re-engage with the hay to carry the same to the throat of the machine where it is discharged. The position of the fork when the arm is moving upward is substantially as shown in Fig. 4. Shoulders 21—21 on the under surface of the bracket 18 maintain the fork in this position and prevent its vibrating in a contrary direction to that hereinbefore described.

Means are provided for raising or lowering the loader to conduct the hay to the forward or rearward part of the wagon as may be desired, consisting of a bar 22 having a ratchet or notches on one end, and one end of which is pivoted to the under side of the frame.

23 is an upright piece secured to the draft pole 24 and to the frame, having a slot at its upper end in which the bar 22 engages to adjust the loader to various angles, with reference to the running gear.

It is essential to working of a hay loader, that any choking at the throat be avoided, this objection is overcome by enabling the rake arms and vibrating forks to get closer to the bed of the loader which is done through the agency of the mechanism hereinbefore described.

Figs. 1, 2 and 9 are intended to show guides of a uniform angle of about eighteen degrees relative to the rake arms, it is apparent, however, that this angle may be somewhat varied without affecting the function of said guides, as for example, in the modified form shown in Fig. 13, where the anti-friction rollers are dispensed with, the angle of guide 15, it will be noted, is greater.

Having described the invention, it is claimed—

1. In a hay loader, the combination with the ground wheels, the carrying frame and the notched bar 22 for elevating said frame; of the vibrating forks having their prongs surrounding and bearing on the rake arms; the brackets 18 attached to the upper side of the rake arms and inclosing the horizontal portion of the forks, said bracket provided with shoulders 21—21, and recess 20, said recess permitting the fork to yield upon the downward movement of the rake arms, and said shoulders maintaining the forks against similar movement in the opposite direction, upon the upward movement of the rake arms, substantially as described.

2. In a hay loader, the combination with the crank shaft and the rake arms mounted thereon; of inclined guides consisting of the angle pieces 12 and 13 attached to the upper ends of the rake arms on an incline thereto; the anti-friction rollers 11 mounted on the stationary shaft 9, said rollers having bearing on the angle pieces 12 and 13, whereby the rake arms are enabled to decrease the area of the discharging throat upon the upward movement of the rake arms, substantially as described.

3. In a hay loader, the combination with the crank shaft, and the rake arms; of the inclined guides consisting of the angle pieces 12 and 13 attached to the upper end of said rake arms on an incline thereto; the shaft 9, mounted in the front end of the frame; the anti-friction rollers 11 mounted on said shaft, said rollers having bearing on the angle pieces 12 and 13, substantially as herein described.

In testimony whereof I have hereunto set my hand this 14th day of August, 1893.

HENRY C. GRAVES,
*Executor of the estate of Jno. T. Bell.*

Witnesses:
GEORGE H. WOOD,
R. JAY McCARTY.

In testimony whereof I have hereunto set my hand this 12th day of August, 1893.

ALEXANDER T. STEWART.

Witnesses:
MERCER B. TATE,
JNO. D. KINNEARD.